March 23, 1937. H. SMITH 2,074,569
SIGNAL DEVICE FOR ELECTRIC APPLIANCES
Filed June 12, 1935
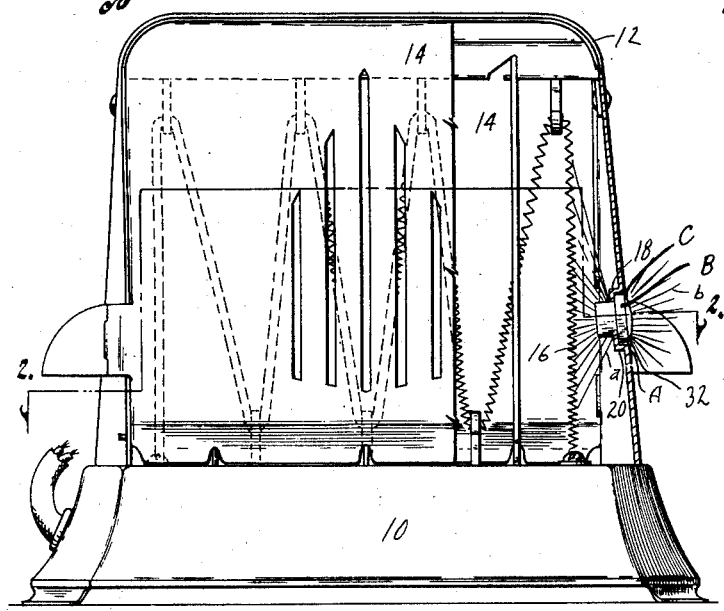
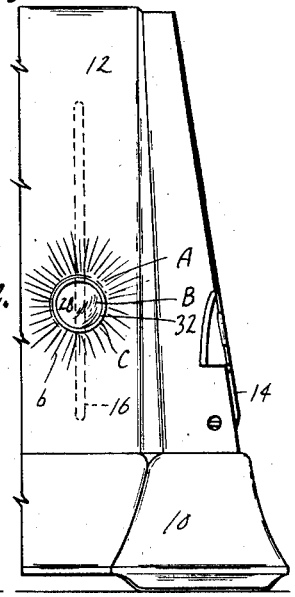
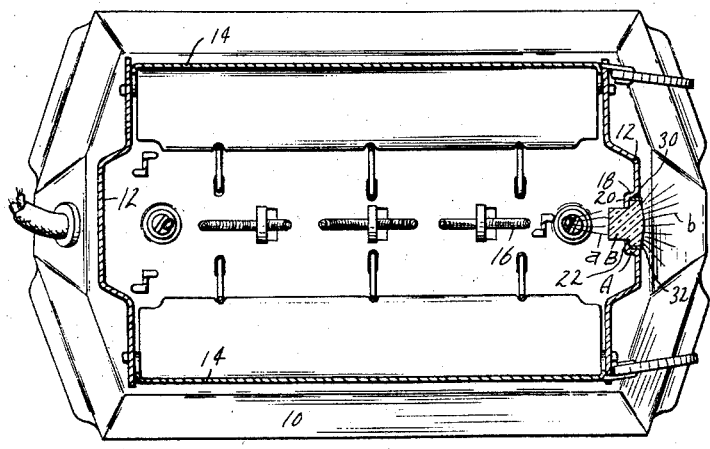
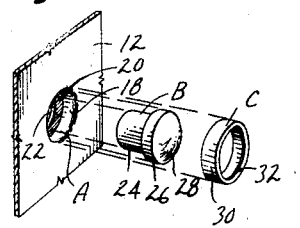
Inventor
Howard Smith
by Bair, Freeman & Sinclair
Attorneys
Witness
H. S. Mengenmaier Patented Mar. 23, 1937

2,074,569

UNITED STATES PATENT OFFICE 2,074,569

SIGNAL DEVICE FOR ELECTRIC APPLIANCES

Howard Smith, St. Louis, Mo., assignor to Knapp-Monarch Company, St. Louis, Mo., a corporation of Missouri Application June 12, 1935, Serial No. 26,219

1 Claim. (Cl. 177—311)

An object of my invention is to provide an inexpensive signal device for electric appliances, which is simple to manufacture and assemble in the appliance, yet effective to clearly indicate whether or not the heating element of the appliance is energized, without, however, having to make any special circuit connections for the signal device.

More particularly, it is my object to provide in a toaster or other electrical appliance casing, an indicator consisting of a transparent element extending through a wall of the casing, a cylindrical part being provided within the casing, and the outer end projecting beyond the face of the casing and being convex for the purpose of diffusing light emitted by the heating element, thus causing the signal device to glow whenever the heating element is energized and to be observable anywhere within an angle of 180° across the face of the appliance in which the signal device is mounted.

Another important object is to mount the signal device in the plane in which the heating element of the appliance is arranged, so as to secure a maximum of light emission therefrom for the purpose of illuminating the signal device to a practical extent, without having to provide a separate filament for the signal device.

With these and other objects in view, my invention consists in the construction, arrangement and combination of the various parts of my signal device for electric appliances, whereby the objects contemplated are attained, as hereinafter more fully set forth, pointed out in my claim, and illustrated in the accompanying drawing, in which:

Figure 1 is a side elevation, partly in section of an electric appliance, showing my signal device in side elevation associated therewith, the appliance by way of illustration being an electric bread toaster.

Figure 2 is a horizontal, sectional view on the line 2—2 of Figure 1, illustrating the relation of the signal device to the heating element of the appliance.

Figure 3 is an end elevation of the appliance, showing the signal device mounted thereon; and Figure 4 is an exploded perspective view of a portion of an appliance casing formed to receive my signal device and the signal device, together with a retainer therefor positioned for coaction with the appliance casing.

On the accompanying drawing, I have used the reference numeral 10 to indicate a base, and 12 a casing element mounted thereon. The appliance illustrated is a bread toaster of the usual construction, having hinged doors 14 for forming in conjunction with the casing element 12, an enclosure for the bread being toasted and a heating element 16 of the toaster, usually located in a vertical plane between two slices of bread.

In at least one end wall of the casing 12, I provide a socket A, comprising a cylindrical side wall 18, and a bottom flange 20, the flange being perforated as at 22. For coaction with the socket, I provide a transparent element B and a retainer ring C.

The element B may be made of glass or the like, and preferably has a cylindrical part 24 to project into the appliance casing through a perforation 22. It has a larger cylindrical portion or flange 26 to seat against the flange 20, and a convex outer end 28.

The retainer ring C comprises a cylindrical flange 30, the outer end of which terminates in a washer-like flange 32.

In the assembly operation, the element B is inserted in the socket 18 with the flange 26 received in the socket, and the portion 24 projecting to a position inside the appliance casing. The ring C is then placed in the position shown in Figure 2, it preferably being a force or press fit into the socket A.

The flange 32 then retains the signal element B against subsequent disengagement from the appliance casing, the flange 26 being confined between the flanges 20 and 32.

The heating element 16 is arranged in a plane and the socket A is arranged substantially in said plane. The purpose of this arrangement is so that a maximum of emitted light from the heating element, as indicated by the light rays $a$ in Figure 1, strikes the signal element B to secure maximum illumination of the element. The inner end of the element B being cylindrical aids in concentrating the light received on the outer surface of the element B, the convexity of which serves to diffuse the light as indicated by the light rays $b$ to an extent which makes it possible to clearly tell whether or not the heating element 16 is energized, regardless of the angle at which the observer is stationed relative to the plane of the end of the toaster casing. The rays $b$ spread through a hemispherical range, as indicated in Figures 1 and 2.

The particular construction illustrated secures a maximum of light for illuminating the signal element without having to provide complicated wiring or a filament in addition to the heating element 16 to illuminate the signal device.

Some changes may be made in the construction and arrangement of the various parts of my signal device without departing from the real spirit and purpose of my invention, and it is my intention to cover by my claim, any modified forms of structure, or use of mechanical equivalents, which may be reasonably included within its scope.

I claim as my invention:

In combination with an electric appliance having a sheet metal casing and a heating element enclosed in said casing, a signal device comprising a transparent element having a head including a convex outer end and having a reduced diameter elongated cylindrical inner end and means for mounting said transparent element in a sheet metal wall of said casing including a retainer ring having a flange surrounding said head and a flange overlying the peripheral edge of said convex outer end, said sheet metal wall having a depressed socket-like portion alined with said heating element, the bottom of said socket-like portion being perforated, said reduced diameter, elongated cylindrical inner end extending through the perforation thereof, the back of said head being seated against the bottom of said socket and the first flange of said retainer ring being frictionally received in said socket-like portion to retain said head in such position.

HOWARD SMITH.